United States Patent
Camiano et al.

(10) Patent No.: US 7,077,179 B1
(45) Date of Patent: Jul. 18, 2006

(54) CORDLESS POWER TOOL AND MULTI-PURPOSE WORKSTATION SYSTEM

(75) Inventors: Robert D. Camiano, Phoenix, AZ (US); Alex Pannone, Goodyear, AZ (US); Bob L. Buck, Gilbert, AZ (US)

(73) Assignee: ABC Product Development, L.L.C., Goodyear, AZ (US)

( * ) Notice: Subject to any disclaimer, the term of this patent is extended or adjusted under 35 U.S.C. 154(b) by 444 days.

(21) Appl. No.: 10/725,658

(22) Filed: Dec. 1, 2003

Related U.S. Application Data

(60) Provisional application No. 60/491,086, filed on Jul. 29, 2003.

(51) Int. Cl.
*B25H 1/00* (2006.01)

(52) U.S. Cl. ............... 144/286.1; 144/285; 144/1.1

(58) Field of Classification Search ............ 144/285, 144/286.1, 286.5, 287, 48.7, 1.1, 360, 371 144/359; 83/477.2, 574
See application file for complete search history.

(56) References Cited

U.S. PATENT DOCUMENTS

| | | | |
|---|---|---|---|
| 2,791,251 A | | 5/1957 | Steele, Jr. |
| 2,822,836 A | | 2/1958 | Horstmann et al. |
| 2,990,859 A | | 7/1961 | Ruben |
| 3,036,608 A | | 5/1962 | Weber |
| 3,342,226 A | * | 9/1967 | Marcoux et al. ......... 144/286.1 |
| 3,556,623 A | | 1/1971 | Damijonaitis |
| 3,734,151 A | * | 5/1973 | Skripsky ................. 144/286.5 |
| 3,905,263 A | | 9/1975 | Smith |
| 3,968,728 A | * | 7/1976 | Goldfarb et al. ............... 409/84 |
| 4,068,550 A | | 1/1978 | Gray et al. |
| 4,252,239 A | * | 2/1981 | Snyder ....................... 206/349 |
| 4,281,570 A | * | 8/1981 | Hill ............................ 83/477.2 |
| 4,335,765 A | * | 6/1982 | Murphy ................... 144/286.1 |
| 4,350,193 A | * | 9/1982 | McCambridge et al. .. 144/286.1 |
| 4,362,196 A | | 12/1982 | Ferdinand et al. |
| 4,465,114 A | * | 8/1984 | Schumacher ............. 144/286.1 |
| 4,483,573 A | * | 11/1984 | Keller ........................ 312/281 |
| 4,489,634 A | | 12/1984 | Volk |
| 4,774,986 A | * | 10/1988 | LaGra ........................ 144/48.5 |
| 5,039,929 A | | 8/1991 | Veistroffer et al. |
| 5,224,531 A | | 7/1993 | Blohm |
| 5,722,473 A | | 3/1998 | Tucker |
| 5,900,715 A | | 5/1999 | Roberts |
| 6,209,597 B1 | | 4/2001 | Calcote |
| 6,360,798 B1 | * | 3/2002 | Apolinski ................. 144/286.5 |
| 6,493,217 B1 | * | 12/2002 | Jenkins, Jr. ............... 361/683 |
| 6,520,227 B1 | * | 2/2003 | McFarlin et al. ........... 144/371 |
| 6,803,744 B1 | * | 10/2004 | Sabo ......................... 320/108 |
| 6,976,744 B1 | * | 12/2005 | Hay et al. ................... 312/281 |
| 2002/0067080 A1 | | 6/2002 | Neumann |
| 2003/0005801 A1 | | 1/2003 | Calcote |

FOREIGN PATENT DOCUMENTS

| | | |
|---|---|---|
| GB | 2 208 071 A | 2/1989 |
| JP | 2000025001 A | 1/2000 |

* cited by examiner

*Primary Examiner*—Bena Miller
(74) *Attorney, Agent, or Firm*—Booth Udall, PLC

(57) ABSTRACT

A workstation, a cordless power tool and workstation system, and a method of installing a cordless power tool on a workstation for operation are disclosed that allow handymen and professionals to use a wide variety of cordless power tools as intended or convert them into a portable, surface mounted setting with the option of AC to DC supplied power or DC supplied power.

40 Claims, 12 Drawing Sheets

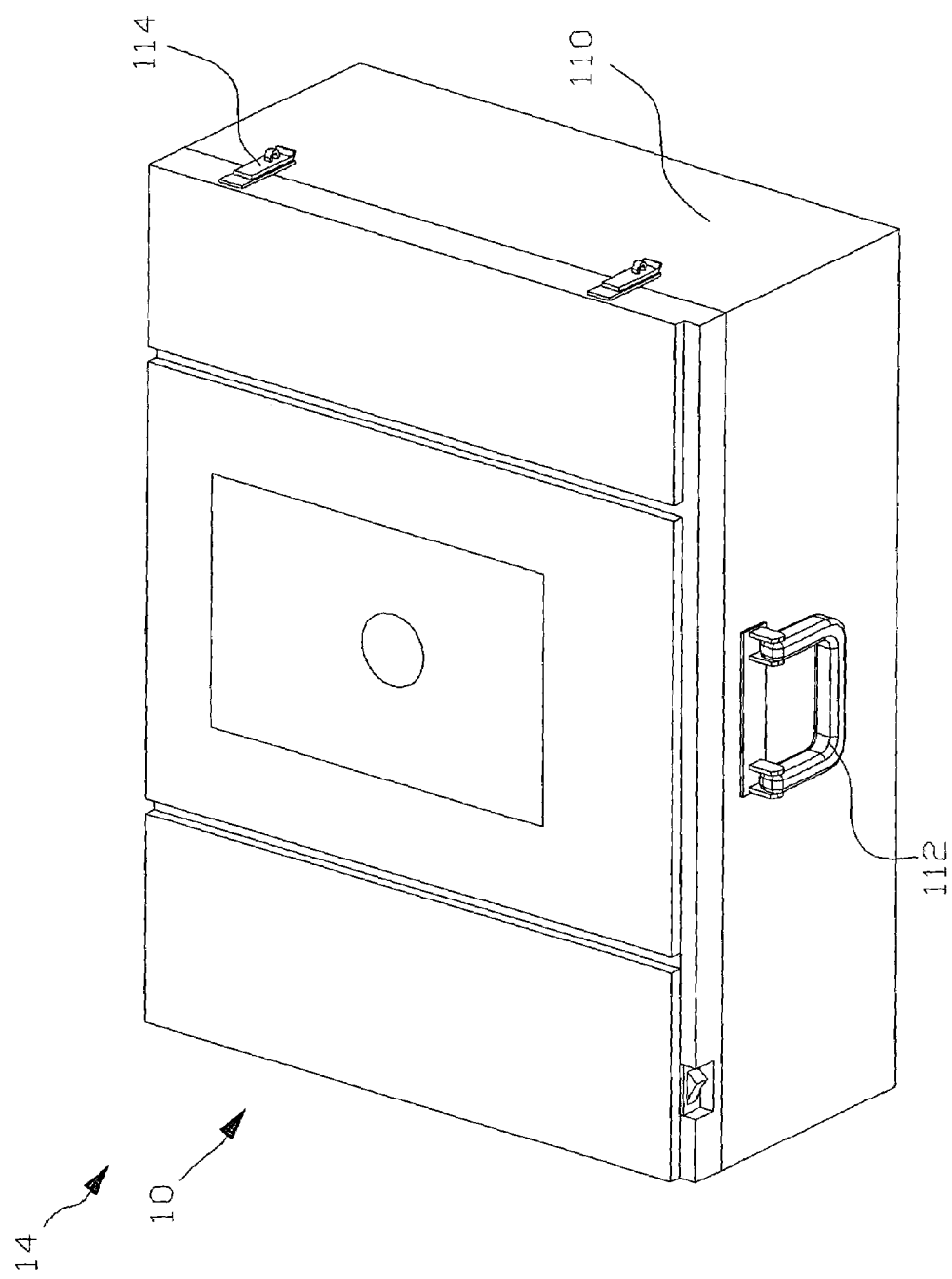

CORDLESS POWER TOOL AND MULTI-PURPOSE WORKSTATION SYSTEM

CROSS REFERENCE TO RELATED APPLICATION

This application claims priority to U.S. Provisional Patent Application to Bob L. Buck, Robert D. Camiano, and Alex Pannone entitled "HANDHELD POWER TOOL AND MULTI PURPOSE WORK BENCH ASSEMBLY," Ser. No. 60/491,086, filed Jul. 29, 2003, the disclosure of which is hereby incorporated entirely herein by reference.

BACKGROUND OF THE INVENTION

1. Technical Field

This invention generally relates to cordless power tools, and more specifically to a cordless power tool and multi-purpose workstation system.

2. Background Art

For the average home handyman or professional, there is not enough money and/or space to have the entire line of AC powered, stand-alone, stationary power tools necessary for a wood or metal shop in one's garage for example. Often, the average home handyman or professional turns to cordless power tools (i.e. battery operated/DC powered tools) instead to try to populate their shops. Cordless power tools allow operators to utilize the tools in places where AC power might not be available, and are often more convenient and easy to use than AC powered stationary or corded power tools. When the charge on the battery pack is low or has depleted, the battery pack is detached from the tool and charged by a battery charger. However, overlapping AC powered, stand-alone, stationary power tools are often still required in addition to their cordless power tool counterparts for certain applications.

There have been a few attempts at workbenches trying to give the home craftsman and professionals the opportunity to use only a couple of different AC powered corded power tools in a very limited space. However, these attempts have not been successful due to one or more of the following drawbacks: high cost; limited versatility; undue complexity; limited availability of AC powered corded power tools to fit the workbenches; reliance on external AC electrical power sources; and complicated and time-consuming tool changeover.

Accordingly, what is needed is a cordless power tool and multi-purpose workstation system that overcomes the expense and space drawbacks of conventional AC powered, stand-alone, stationary power tools, increases the efficiency and broadens the applications of cordless power tools, and allows for handymen and professionals with limited space and/or purchasing power to possess a highly versatile, portable workstation that may be located virtually anywhere regardless of the availability of an external AC electrical power source.

DISCLOSURE OF THE INVENTION

The present invention may be readily adapted to a variety of cordless power tool and multi-purpose workstation systems that satisfy the aforementioned needs. The invention allows handymen and professionals to use a wide variety of cordless power tools as intended or convert them into a portable, surface mounted setting with the option of AC to DC supplied power or DC supplied power. Thus, handymen and professionals with limited space and/or purchasing power may posses a highly versatile, portable workstation that can be set up at virtually any location, eliminating the need for multiple stand alone AC powered table mounted tools and providing handymen and professionals the versatility that they never had before.

In particular embodiments, the present invention provides a workstation wherein virtually any cordless power tool may be removably mounted thereon for operation. The workstation may comprise a substantially planar work support platform configured to support a work piece and a cordless power tool. A substantially planar swing arm may be pivotally coupled to the work support platform. A battery charging station may be coupled to the work support platform and may be configured to removably connect to an external AC power source, the battery charging station supplying DC power for cordless power tool operation. An on/off switch may be coupled to the battery charging station for regulating the flow of DC power to a cordless power tool. A safety switch may coupled to the on/off switch for regulating the flow of DC power to a cordless power tool. Both the on/off switch and the safety switch allow a cordless power tool on/off switch to be safely disengaged when a cordless power tool is mounted to the workstation. A power block may be coupled to the safety switch for removably connecting to the cordless power tool. At least one mounting plate may be removably coupled to the swing arm, the mounting plate configured to removably couple to a cordless power tool.

In other particular embodiments, the present invention provides A cordless power tool and workstation system for operating a cordless power tool. The system may comprise a cordless power tool mounted to a workstation. The workstation may comprise a substantially planar work support platform configured to support a work piece. A substantially planar swing arm may be pivotally coupled to the work support platform, wherein the swing arm is pivotable to any angle with respect to the work support platform from 0° to approximately 90° for ease in mounting and dismounting the cordless power tool. A battery charging station may be coupled to the work support platform and may be configured to removably connect to an external AC power source, the battery charging station supplying DC power to the cordless power tool. An on/off switch may be coupled to the battery charging station and regulates the flow of DC power to the cordless power tool. A safety switch may be coupled to the on/off switch and also regulates the flow of DC power to the cordless power tool. A power block may be coupled to the safety switch and may be removably connected to the cordless power tool. A mounting plate to which the cordless power tool is removably coupled may be removably coupled to the swing arm.

In still other particular embodiments, the present invention provides a method of installing a cordless power tool on a workstation for operation. The method may comprise: removing a battery from the cordless power tool; removably coupling the cordless power tool to the mounting plate; removably coupling the mounting plate to the swing arm; removably coupling the power block to the cordless power tool in place of the battery of the cordless power tool; pivoting the swing arm flush with the work support platform, thereby closing the safety switch; and operating the cordless power tool using the on/off switch.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings, where like designations denote like elements, and:

FIG. 7 is a perspective view of a cordless power tool and multi-purpose workstation system according to still another embodiment of the invention;

DESCRIPTION OF THE INVENTION

Figure 1:
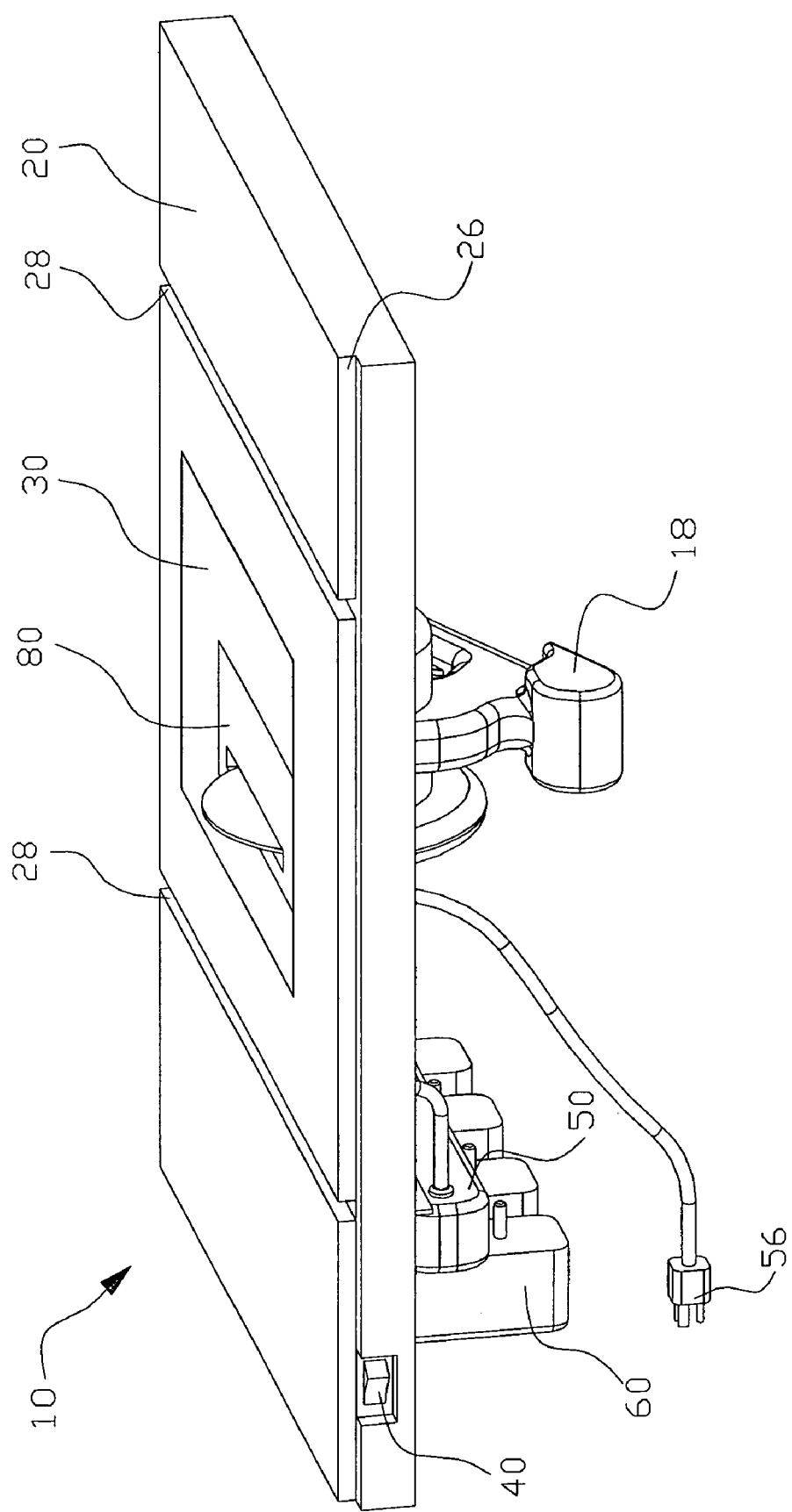
FIG. 1 a perspective view of a cordless power tool and multi-purpose workstation system according to an embodiment of the invention.

Generally, a cordless power tool and multi-purpose workstation system of the invention may include virtually any hand-held cordless power tool removably mounted to a portable workstation providing the option of AC to DC supplied power or DC supplied power. In embodiments of a cordless power tool and multi-purpose workstation system of the invention, the workstation may comprise a work support platform. Pivotally coupled to the work support platform may be a swing arm. At least one mounting plate may then be used to facilitate the removable mounting of a cordless power tool to the swing arm. The at least one mounting plate may be a single, universal mounting plate configured to accommodate a plurality of cordless power tools, or the at least one mounting plate may be a plurality of interchangeable mounting plates, each one configured to accommodate a particular cordless power tool.

Accordingly, although the invention may be readily adapted to a variety of embodiments of a cordless power tool and multi-purpose workstation system, with reference to FIGS. 1–3 and 5A–6C, cordless power tool and multi-purpose workstation system 10 is an example of a cordless power tool and multi-purpose workstation system of the invention. Cordless power tool and multi-purpose workstation system 10 generally includes a cordless power tool 18 and a workstation having a work support platform 20, a swing arm 30, an on/off switch 40, a safety switch 42, a battery charging station 50, at least one battery 60, a power block 70, and a mounting plate 80.

Describing cordless power tool and multi-purpose workstation system 10 in greater detail and still referring to FIGS. 1–3 and 5A–6C, cordless power tool 18 may be virtually any battery operated/DC powered tool. Once battery 60 is charged, cordless power tool 18 may be used without the need of AC power (i.e. a power cord plugged into a fixed outlet). Although the invention is particularly useful when cordless power tool 18 comprises a cordless circular saw, it will be understood by those of ordinary skill in the art that the invention is not limited to uses relating to cordless circular saws. Rather, any description or illustration relating to cordless circular saws is for the exemplary purposes of this disclosure, and those of ordinary skill in the art will also understand that the invention may also be used in a variety of applications with similar results for a variety of cordless power tools, such as drills, belt sanders, orbital sanders, circular sanders, laminate trimmers, routers, reciprocating saws, biscuit cutting tools, metal cutting saws, metal shears, metal nibblers, planners, jointers, and the like.

Work support platform 20 may be any substantially planar platform to which a work piece and cordless power tool 18 may be supported. For the exemplary purposes of this disclosure, work support platform 20 may be rectilinear (e.g. rectangular) in shape. Work support platform 20 may comprise: fence recess 26 extending longitudinally along a length of an external front edge of platform 20; a pair of spaced apart, parallel, cross-cut miter slots 28 in a top face of platform 20 extending from and perpendicular to fence recess 26 through an external rear edge of platform 20; and platform opening 22 through platform 20 between the pair of miter slots 28. Platform opening 22 is configured to removably receive swing arm 30 as discussed in greater detail below so that the substantially planar top surfaces of platform 20 and swing arm 30 are flush when cordless power tool 18 is operated. To this end, platform 20 may further include at least one flange 24 running at least partially along at least one internal edge of platform 20 defining platform opening 22 upon which swing arm 30 rests. For the exemplary purposes of this disclosure, platform opening 22 defined in platform 20 may be rectangular in shape and at least one flange 24 may comprise a continuous right angle flange 24 running around a internal short edge and an adjacent internal long edge of platform 20 (e.g., the internal edges of platform 20 where the corresponding exposed base member and exposed arm of swing arm 30 rest as described below). Notwithstanding, and for example, at least one flange 24 may comprise a single flange 24 running along only the long internal edge of platform 20 opposite the other long internal edge of platform 20 where swing arm 30 is pivotally attached as described below.

Swing arm 30 may be any pivotally mounted, substantially planar platform to which at least one mounting plate 80 and/or cordless power tool 18 may be removably coupled. For the exemplary purposes of this disclosure, swing arm 30 may be U-shaped platform comprising a base member and a pair of spaced apart parallel arms defining swing arm opening 36, each arm extending perpendicularly from an end of the base member. Formed on a bottom face of swing arm 30 adjacent to at least portions of internal edges of the base member and/or the parallel arms may be at least one securing track 32. At least one securing track 32 may comprise at least one wall protruding perpendicularly outward from the bottom face of swing arm 30 and an inwardly protruding flange member formed on the exposed end of the at least one wall. The configuration of at least one securing track 32 and the internal portion of the base member and/or the parallel arms of swing arm 30 defines at least one channel wherein at least the at least one mounting plate 80 may be removably mounted in the channel in a tongue and groove relationship as described in greater detail below. For the exemplary purposes of this disclosure, at least one securing track 32 comprises a continuous securing track 32 extending along and adjacent to the internal edges of the base member and the parallel arms of swing arm 30. Notwithstanding, and for example, at least one securing track 32 may comprise three separate and distinct securing tracks 32 extending partially or entirely along and adjacent to the internal edges of the base member and the parallel arms of swing arm 30.

Swing arm 30 may be pivotally mounted to platform 20 in any manner so that swing arm 30 may be pivoted to any angle with respect to platform 20 from 0° (i.e. FIGS. 6A–6C) to approximately 90° (i.e. FIGS. 5A–5B) or greater for ease in mounting cordless power tool 18. For the exemplary purposes of this disclosure, swing arm 30 may be mounted to platform 20 using hinge 34, which may be a piano hinge for example. Hinge 34 may be coupled either to an arm or the base member of swing arm 30, but for the exemplary purposes of this disclosure, hinge 34 may be coupled to an arm of swing arm 30 and a corresponding portion of the bottom face of platform 20 adjacent an internal edge of platform 20 defining platform opening 22.

On/off switch 40 and safety switch 42 may be any switches known in the art consistent with the electrical operation of circuitry for supplying DC electrical power to the various electrical components of cordless power tool and multi-purpose workstation system 10. Switches are devices used to allow electric current to flow when closed, and when opened, they prevent current flow. Possible switch types include pushbutton, rocker, toggle, rotary, keylock, slide, snap action, and reed for example. A pushbutton switch is a mechanical switch defined by the method used to activate the switch. The activation method may be in the form of a plunger that is pushed down to close the switch and automatically releases when pressure is removed to open the switch. Rocker actuators are familiar in many on-off switches; they rock or pivot about the centerline, and include both maintained and momentary contact types. In a toggle switch, the toggle moves or swings to make or break the circuit; includes maintained contact and momentary contact types. Rotary switches move in a circle, and can stop in several positions along its range. Keylock switches employ a key as the means of activation. The key is turned in a circle and can stop in several positions in its range. In a slide switch, a slider moves linearly (slides) from position to position. A snap action switch is a mechanical switch that produces a very rapid transfer of contacts from one position to another. They are useful in situations that require a fast opening or closing of a circuit. Reed switches are magnetically activated switches. They may be manufactured with two ferromagnetic reeds (contact blades), which are sealed in a glass capsule. In the presence of a magnet, the blades (contacts) close.

On/off switch 40 may be connected to battery charging module 52 and safety switch 42 may be connected to on/off switch 40, both switches 40 and 42 regulating the DC power to cordless power tool 18 allowing the on/off switch on cordless power tool 18 to be safely disengaged when cordless power tool 18 is mounted to swing arm 30. For the exemplary purposes of this disclosure, on/off switch 40 may be a rocker switch located on the front edge of platform 20 and safety switch 42 may be a pushbutton switch located on the at least one flange 24 of platform 20 so that it may depressed when swing arm 30 is pivoted flush with platform 20 and released when swing arm 30 is pivoted away from platform 20. Thus, only when cordless power tool 18 is mounted to swing arm 30, safety switch 42 is depressed by swing arm 30, and on/off switch 40 is closed may cordless power tool 18 be operated.

Battery charging station 50 may connect between an external AC power source, at least one battery 60, and on/off switch 42. Battery charging station 50 may comprise battery charging module 52 having at least one port or socket similar to the port or socket on cordless power tool 18 for receiving a connection portion of and charging at least one battery 60. Battery charging modules are used for charging rechargeable batteries. Charging is the process of returning a discharged battery to a state in which it may be used again. There are at least four methods that may be used for recharging batteries: constant-current, constant potential (or voltage), float, pulse, ripple, taper, and trickle. Battery charging modules are manufactured with specific battery types in mind. Many chargers are for lithium or zinc air batteries, which may be connected to an AC power source and the current is fed back into the rechargeable batteries. Multiple cell battery charging modules are available when the situation dictates that many batteries will need to be recharged at the same time. For the exemplary purposes of this disclosure, battery charging module 52 may have a plurality of ports or sockets for receiving portions of and charging a plurality of batteries 60 simultaneously.

Battery charging module 52 may include a power relay. Electromechanical relays are devices that complete or interrupt a circuit by physically moving electrical contacts into contact with each other. A relay involves two circuits: the energizing circuit and the contact circuit. The coil is on the energizing side and the relay contacts are on the contact side. When a relay coil is energized, current flow through the coil creates a magnetic field. In a DC circuit, where the polarity is fixed, the magnetic coil attracts a ferrous plate, which is part of the armature. One end of the armature is attached to the metal frame that is formed so that the armature can pivot, while the other end opens and closes the contacts. Relay contacts are designed, built and specified for the type of application for the relay. No single voltage and current rating applies to a given set of contacts under all circumstances. Possible relay-type choices available for electromechanical relays include general-purpose relay, machine control or heavy-duty relay, and reed relay for example. Possible mounting choices for electromechanical relays include socket or plug-in style and bracket or flange mount for example. Possible pole choices for electromechanical relays include single pole (SP), double pole (DP), triple pole (TP), four pole (4P), and greater than four poles for example. Possible throw choices for electromechanical relays include single throw or double throw. Single throw (ST) relays have a pair of contacts open in one position and closed in the other. Double throw (DT) relays have three contacts. The common one is in contact with the second, but not with the third, in one position of the relay, and reverses this connection in the other relay position. Other possible features for electromechanical relays include convertible contacts, polyphase relay, time delay, intrinsically safe, visual indicators, sealed relay, push-to-test button, current sensitive, voltage sensitive, expandable deck, and latching controls for example.

For the exemplary purposes of this disclosure, the power relay of battery charging module 52 charges batteries 60 with DC power when they are plugged in to charging module 52 and/or outputs DC power to operate cordless power tool 18 when the DC circuit to power block 70 is complete and power block 70 is removably connected to cordless power tool 18. When no external AC source is available or desired to be used, the power relay enables the use of batteries 60 to supply the DC power to cordless power tool 18.

Battery charging station 50 may also comprise AC to DC power converter (AC/DC converter) 54, the output side of which being connected to battery charging module 52. AC/DC converters accept AC input voltage directly from a wall outlet for example, and output DC voltage for charging batteries and/or operating cordless power tools for example. One configuration for an AC/DC converter may be where the AC/DC converter is in-line between the AC plug and the DC output. Nominal AC input choices for AC/DC converters may include 115 VAC, 230 VAC, 115/230 VAC selectable, 115/230 VAC wide-ranging or auto-select, 220 VAC European, and 100 VAC Japan for example. DC output choices for AD/DC converters may include 3.3V, 5V, 12V, 15V, 24V, and 48V for example. AC/DC converters may be capable of more than one output. Features for AC/DC converters include overvoltage protection, overcurrent protection, and short circuit protection. Overvoltage protection is internal circuitry that limits or shuts down the voltage output in an overvoltage condition. When present, it is most usually found on the primary output. Overcurrent protection is internal circuitry that limits or shuts down the current output in an overcurrent condition. Short circuit protection includes techniques to protect the power supply in the event of a short circuit on the load may include electronic current limiting and thermal resets with automatic recovery.

AC/DC converter 54 may output DC power to battery charging module 52 so that AC/DC converter 54 may supply power to cordless power tool 18 without having to remove any batteries 60 from battery charging module 52. For the exemplary purposes of this disclosure, AC/DC converter 54 converts AC supplied power from an external AC power source through AC plug 56 connected to an input side of AC/DC converter 54 in order to supply DC electrical power to run cordless power tool 18 directly and/or to charge at least one battery 60, which in turn distributes DC power to cordless power tool 18 for operation thereof when no external AC power source is available or not desired to be used.

At least one battery 60 may be any rechargeable battery known in the art configured for use with cordless power tool 18. Rechargeable batteries, also known as secondary batteries, contain active materials that are regenerated by charging. When the energy produced by these batteries drop below optimum efficiency, they may be recharged in any one of many manners, depending upon their construction. Rechargeable batteries are broken down into two main classifications based upon the chemical composition of the battery. Both of these classifications, alkaline secondary and lithium secondary, contain a wide assortment of battery styles. Some alkaline secondary batteries may include: Nickel-cadmium batteries (Ni—Cd); Nickel-zinc batteries; Nickel-iron batteries (NiFe); Silver oxide batteries (AgO), Silver-zinc batteries; Nickel hydrogen batteries (Ni—$H_2$); and Nickel-metal hydride batteries (NiMH). Some lithium rechargeable batteries may include: Lithium/manganese dioxide BATTERIES (Li/$MnO_2$); Lithium/titanium disulfide batteries (Li/$TiS_2$); Lithium/iron sulfide batteries (LiFeSx); Lithium/manganese titanium batteries (LiMnTi); Lithium/nickel oxide batteries (LiNi$O_2$); Lithium/manganese oxide batteries (Li$Mn_2O_4$). For the exemplary purposes of this disclosure, at least on battery 60 comprises at least three batteries 60 in addition to the battery 60 provided with cordless power tool 18.

Power block 70 may output DC power to and may be configured to be connected to cordless power tool 18 in place of battery pack 60 when cordless power tool 18 is mounted to swing arm 30. For the exemplary purposes of this disclosure, power block 70 is a versatile corded, modular, insulated terminal block, with the cord end connected to safety switch 42 and the free, terminal block end configured to connect with the port in cordless power tool 18 for battery pack 60 no matter the mounted position of cordless power tool 18 on swing arm 30.

At least one mounting plate 80 may be configured to facilitate the removable mounting of cordless power tool 18 to swing arm 30. At least one mounting plate 80 may be a single, universal mounting plate configured to accommodate a plurality of cordless power tools 18, or at least one mounting plate 80 may be a plurality of interchangeable mounting plates, each one configured to accommodate a particular cordless power tool 18. For the exemplary purposes of this disclosure, at least one mounting plate 80 may be a plurality of interchangeable mounting plates, each one configured to accommodate a particular cordless power tool 80.

The at least one channel formed by at least one securing track 32 and the internal portion of the base member and/or the parallel arms of swing arm 30 is configured to allow at least the at least one mounting plate 80 to be removably mounted therein in a tongue and groove relationship so that the substantially planar top surfaces of platform 20, swing arm 30, and at least one mounting plate 80 are flush when cordless power tool 18 is operated. For the exemplary purposes of this disclosure, the at least one channel may be configured to allow the at least one mounting plate 80 to be removably mounted in the at least one channel in a tongue and groove relationship. In such a configuration, removable fasteners (e.g., screws, bolts and nuts, clamps, retaining clips, lugs, hasps, clasps, catches, any combination thereof, and the like) are required to removably secure base plate/guide surface/shoe 19 for example of cordless power tool 18 to the bottom face of at least one mounting plate 80. Particularly, at least one mounting plate 80 may have a substantially rectangular, two-tiered overall shape, the top tier or portion thereof narrower than the bottom tier or portion thereof. Accordingly, the top portion may only be inserted and received in swing arm opening 36 in a flush relationship as depicted in FIGS. 5B and 6B while the bottom portion may only be simultaneously inserted and received in a tongue and groove relationship in the at least one channel formed by at least one securing track 32 and the internal portion of the base member and/or the parallel arms of swing arm 30.

Notwithstanding, and for example, the at least one channel may be configured to allow both the at least one mounting plate 80 and shoe 19 of cordless power tool 18 to be removably mounted in the at least one channel in a tongue and groove relationship. Thus, this configuration would not require any fasteners to removably secure cordless power tool 18 to at least one mounting plate 80.

Figure 2:
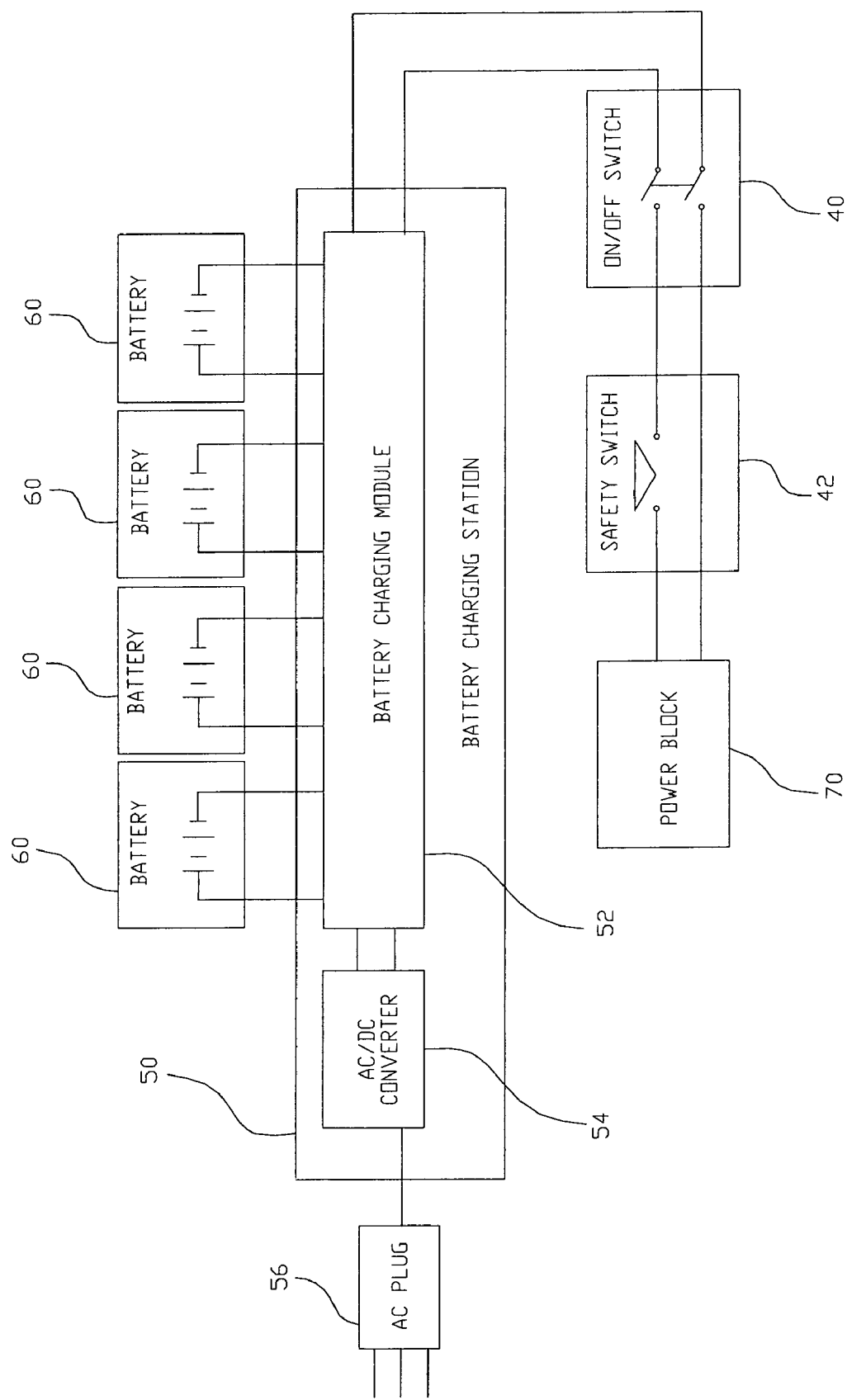
FIG. 2 is a circuit diagram of the system of FIG. 1

Turning now to FIG. 2 and for the exemplary purposes of this disclosure, circuitry for supplying DC electrical power to the various electrical components of cordless power tool and multi-purpose workstation system 10 is depicted. The various electrical components of cordless power tool and multi-purpose workstation system 10 may be connected together in any number of connection configurations. An example of a connection may include, without limitation, electronic cable.

An external AC power source may supply AC electrical power (e.g., 115–223 volt 60 Hertz AC electrical power) to AC/DC converter 54 in battery charging station 50 through AC plug 56 connected to AC/DC converter 54. AC/DC converter 54 in turn may output DC electrical power (e.g., 48V DC electrical power) to battery charging module 52 to which it is connected.

Rechargeable batteries 60 are removably connected to battery charging module 52. Power block 70, which out puts DC power to cordless power tool 18 when it is removably connected thereto, is also connected to battery charging module 52 via safety switch 42 (to which it is connected), which in turn is connected to on/off switch 40, which in turn is connected to battery charging module 52. Thus, batteries 60 receive DC power for charging and switches 40 and 42 receive DC power for actuation from battery charging module 52, but when switches 40 and 42 are open, they prohibit the DC circuit to power block 70 from being completed.

A power relay in battery charging module 52 charges batteries 60 with DC power when they are plugged in to charging module 52 and/or outputs DC power to operate cordless power tool 18 when the DC circuit to power block 70 is complete and power block 70 is removably connected to cordless power tool 18. When no external AC source is available or desired to be used, the power relay enables the use of batteries 60 to supply the DC power to cordless power tool 18.

Figure 4:
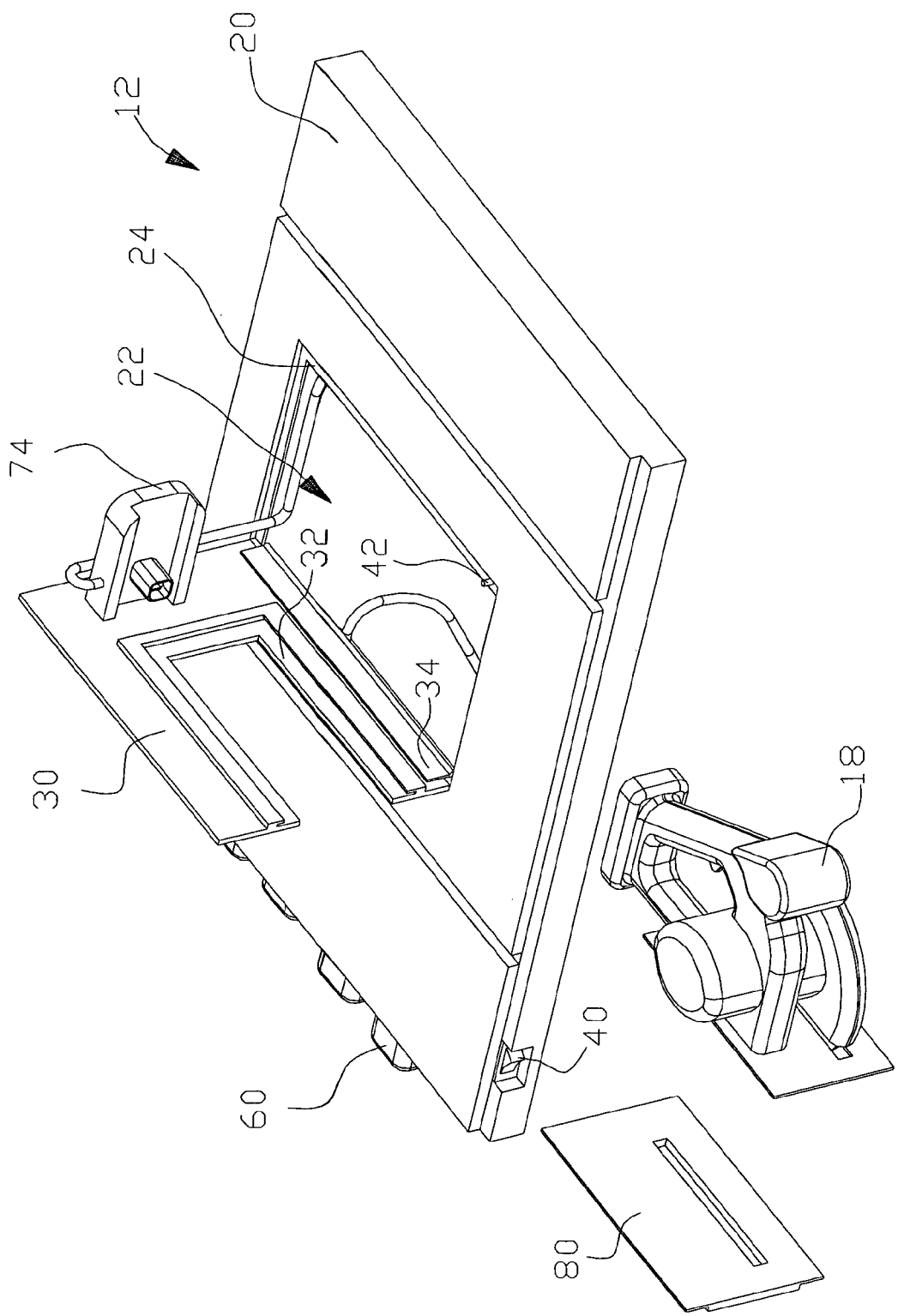
FIG. 4 is an exploded perspective view of a cordless power tool and multi-purpose workstation system according to another embodiment of the invention.

Turning to FIG. 4, although the invention may be readily adapted to a variety of embodiments of a cordless power tool and multi-purpose workstation system, cordless power tool and multi-purpose workstation system 12 is an example of a cordless power tool and multi-purpose workstation system of the invention. Cordless power tool and multi-purpose workstation systems 12 is similar to cordless power tool and multi-purpose workstation system 10 as just described. The main difference between cordless power tool and multi-purpose workstation system 12 and cordless power tool and multi-purpose workstation system 10 is the employment of power block 74 in place of power block 70 in cordless power tool and multi-purpose workstation systems 12. Power block 74 is similar to power block 70 in that it may output DC power to and may be configured to be connected to cordless power tool 18 in place of battery pack 60 when cordless power tool 18 is mounted to swing arm 30. However, and for the exemplary purposes of this disclosure, power block 74 is a corded, modular, insulated terminal block with the cord end connected to safety switch 42 and the terminal block end coupled to swing arm 30 in a fixed position. Power block 74 is still configured to connect with the port in cordless power tool 18 for battery pack 60, and because of its fixed nature, provides further mounting support for cordless power tool 18 when mounted to swing arm 30. However, also because of its fixed nature, power block 74 is not as versatile as power block 70 and may not be able to connect with the battery pack 60 ports in some cordless power tools 18 because of their required mounted position on swing arm 30.

It will be understood by those of ordinary skill in the art that the invention is not limited to the specific cordless power tool and multi-purpose workstation systems and components disclosed herein, as virtually any components known in the art consistent with the intended operation of cordless power tool and multi-purpose workstation system of the invention may be utilized. Accordingly, for example, although particular cordless power tools, shoes, work stations, work support platforms, openings, flanges, recesses, slots, arms, tracks, hinges, switches, charging stations, charging modules, converters, batteries, blocks, mounting plates, fences, miter gauges, slide bars, cases, boxes, chests, handles, fasteners, and other components are disclosed, such components may comprise any shape, size, style, type, model, version, measurement, concentration, material, quantity, and/or the like as is known in the art for such components consistent with the intended operation of a cordless power tool and multi-purpose workstation system of the invention. It will also be understood by those of ordinary skill in the art that the invention is not limited to use of any specific components, provided that the components selected are consistent with the intended operation of a cordless power tool and multi-purpose workstation system of the invention.

The components defining any cordless power tool and multi-purpose workstation system embodiment of the invention may be formed of any of many different types of materials or combinations thereof that can readily be formed into shaped objects provided that the components selected are consistent with the intended operation of a cordless power tool and multi-purpose workstation system of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acyclic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The components defining any cordless power tool and multi-purpose workstation system embodiment of the invention may be purchased pre-manufactured or manufactured separately and then assembled together. However, any of the components may be manufactured simultaneously and integrally joined with one another. Manufacture of these components separately or simultaneously may involve extrusion, pultrusion, vacuum forming, injection molding, blow molding, resin transfer molding, rotational molding, casting, milling, stamping, cutting, welding, soldering, riveting, punching, and/or the like. If any of the components are manufactured separately, they may then be coupled with one another in any manner known in the art, such as with adhesive, a weld, a fastener (e.g. a bolt, a bolt and nut, a screw, a nail, a rivet, a pin, a clamp, a retaining clip, and the like), wiring or cable, any combination thereof, and/or the like for example, depending on, among other considerations, the particular material forming the components. Other possible steps might include sand blasting, polishing, powder coating, and/or painting the components for example.

Figure 3:
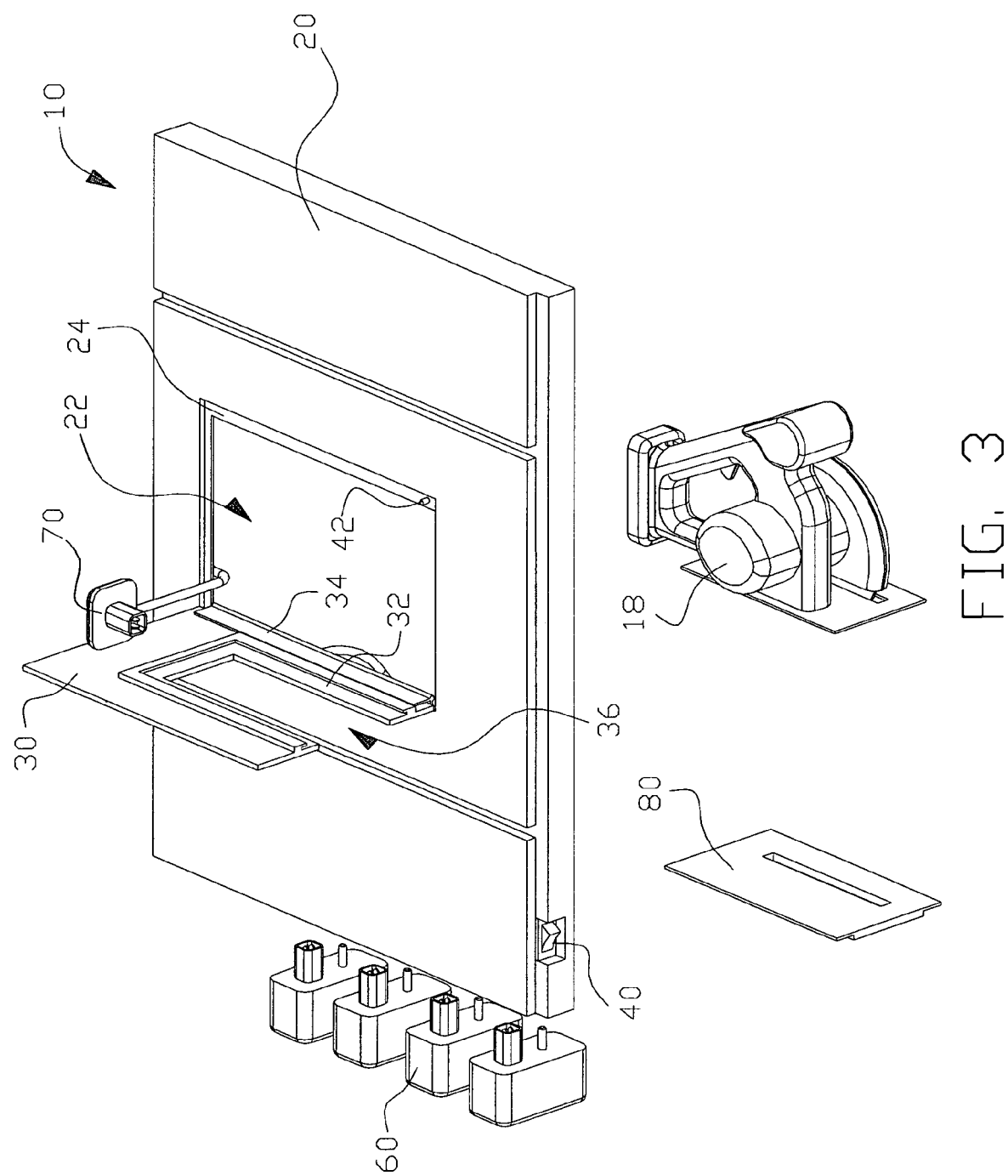
FIG. 3 is an exploded perspective view of the system of FIG. 1.

Accordingly, for example, at least one securing track 32 and swing arm 30 may be integrally joined to one another as depicted in FIGS. 3, 4, and 5B, or they may be distinct portions coupled together. Likewise, for example, at least one flange 24 and platform 20 may be integrally joined to one another as depicted in FIGS. 3, 4, and 5A, 6C, and 8, or they may be distinct portions coupled together.

For the exemplary purposes of this disclosure, cordless power tool 18 may be installed on a portable workstation for operation as depicted in FIGS. 3 and 5A–6B. Cordless power tool 18 may be installed on a portable workstation for operation as depicted in FIG. 4 in a similar manner as that depicted in FIGS. 3 and 5A–6B and described below, and therefore, will not be described.

Turning to FIG. 3, battery 60 may be removed from cordless power tool 18 and, along with any other extra batteries 60, if any, may be removably inserted into battery charging module 52 of battery charging station 50 for recharging and/or powering system 10. Cordless power tool 18 may then be removably coupled to mounting plate 80 in any manner as previously described.

Figure 5A:
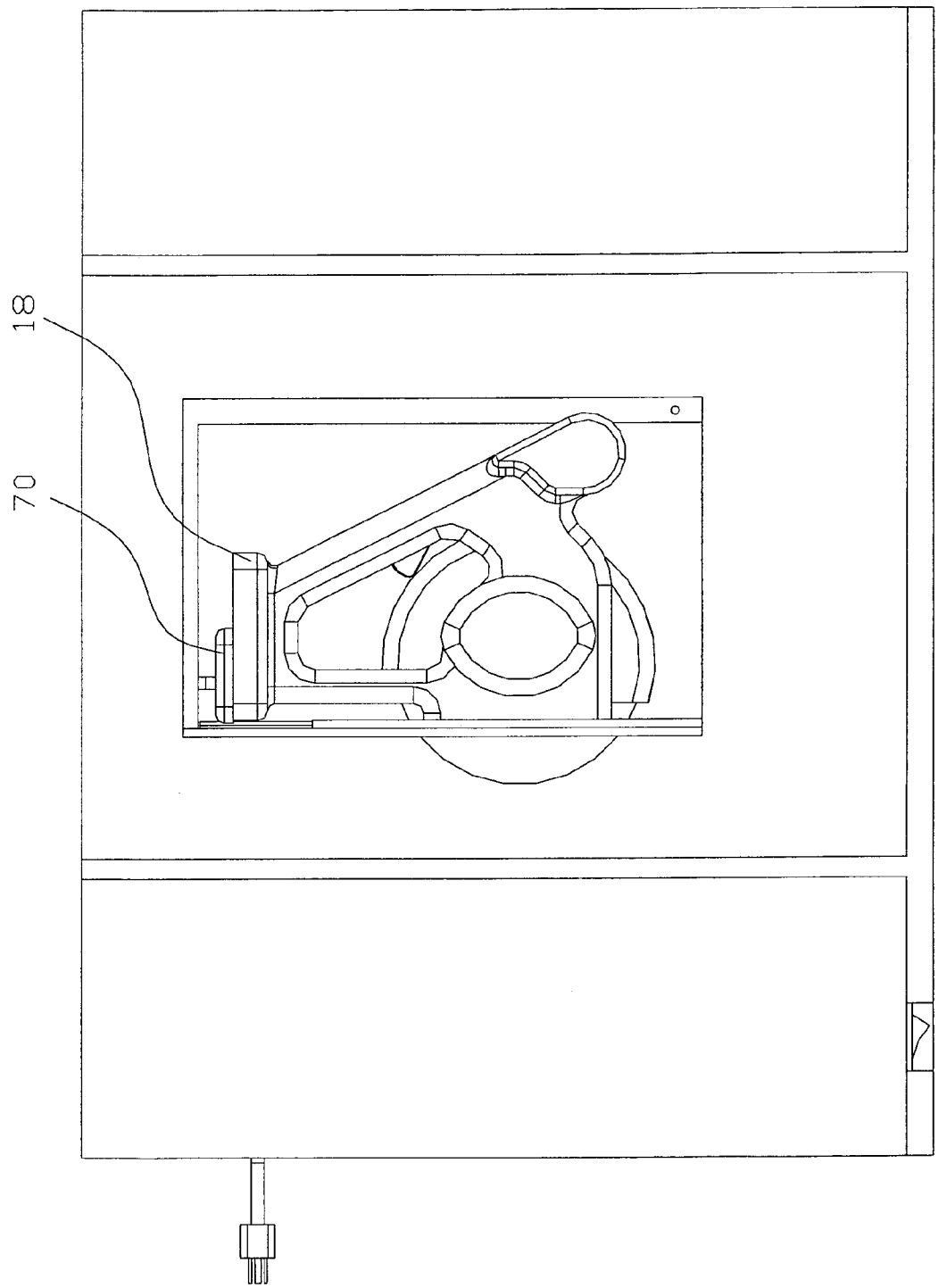
FIGS. 5A and 6A are top views at different stages during the assembly of the system of FIG. 1.
Figure 5B:
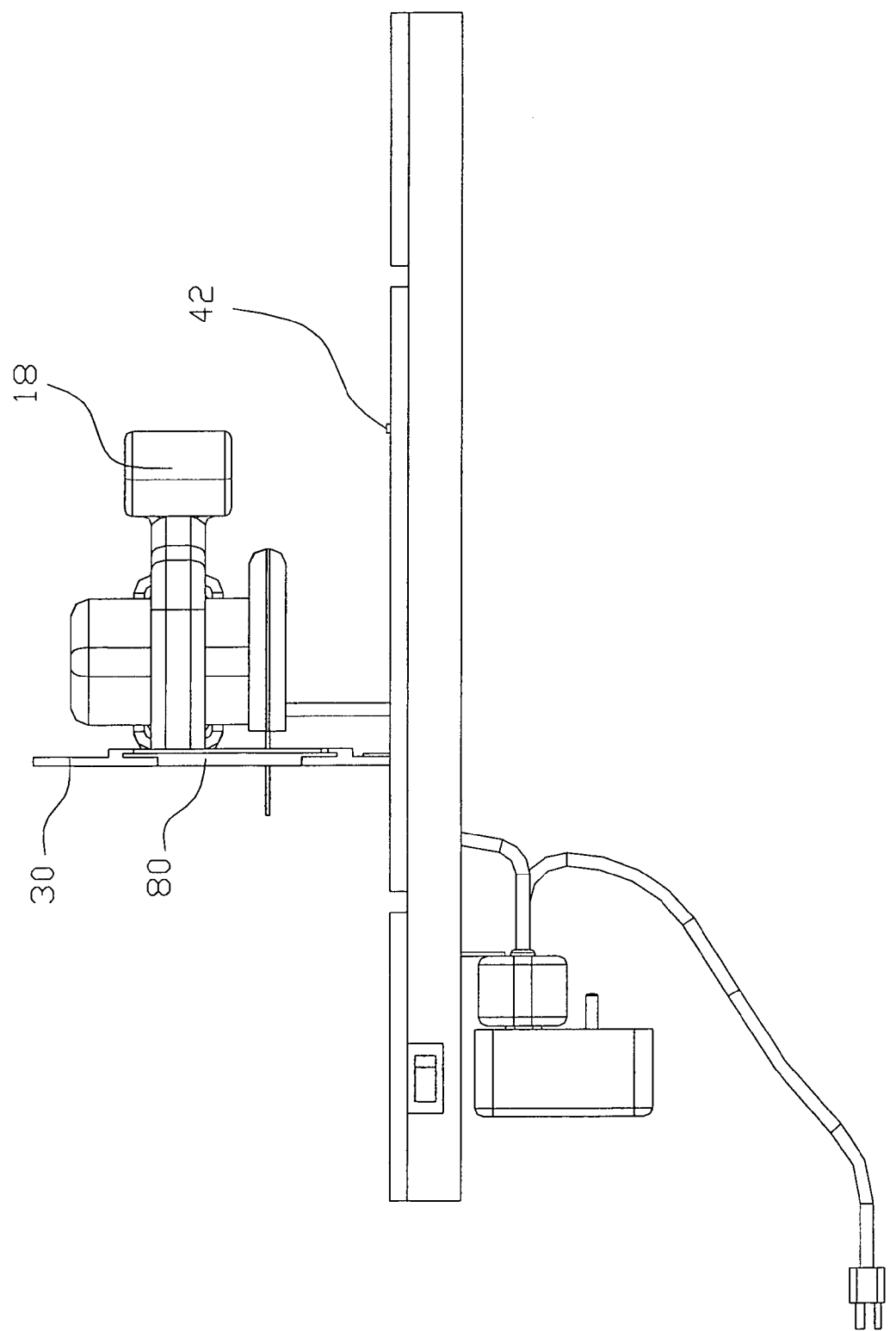
FIGS. 5B and 6B are end views at different stages during the assembly of the system of FIG. 1.

Referring now to FIGS. 5A–5B, this combination may be removably coupled to swing arm 30 in any manner as previously described. Power block 70 may then be removably coupled to cordless power tool 18 in any manner as previously described.

Figure 6A:
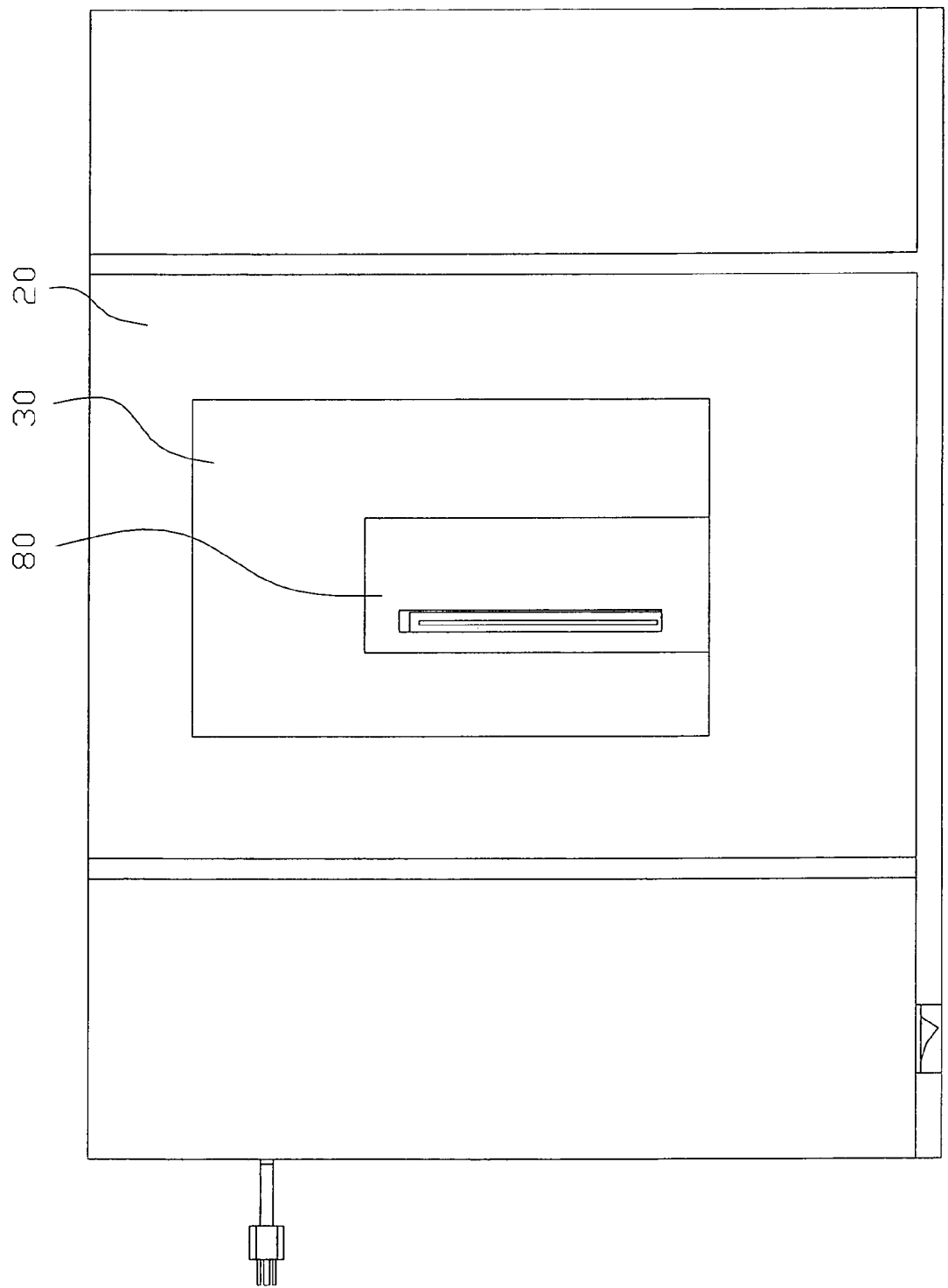
Figure 6B:
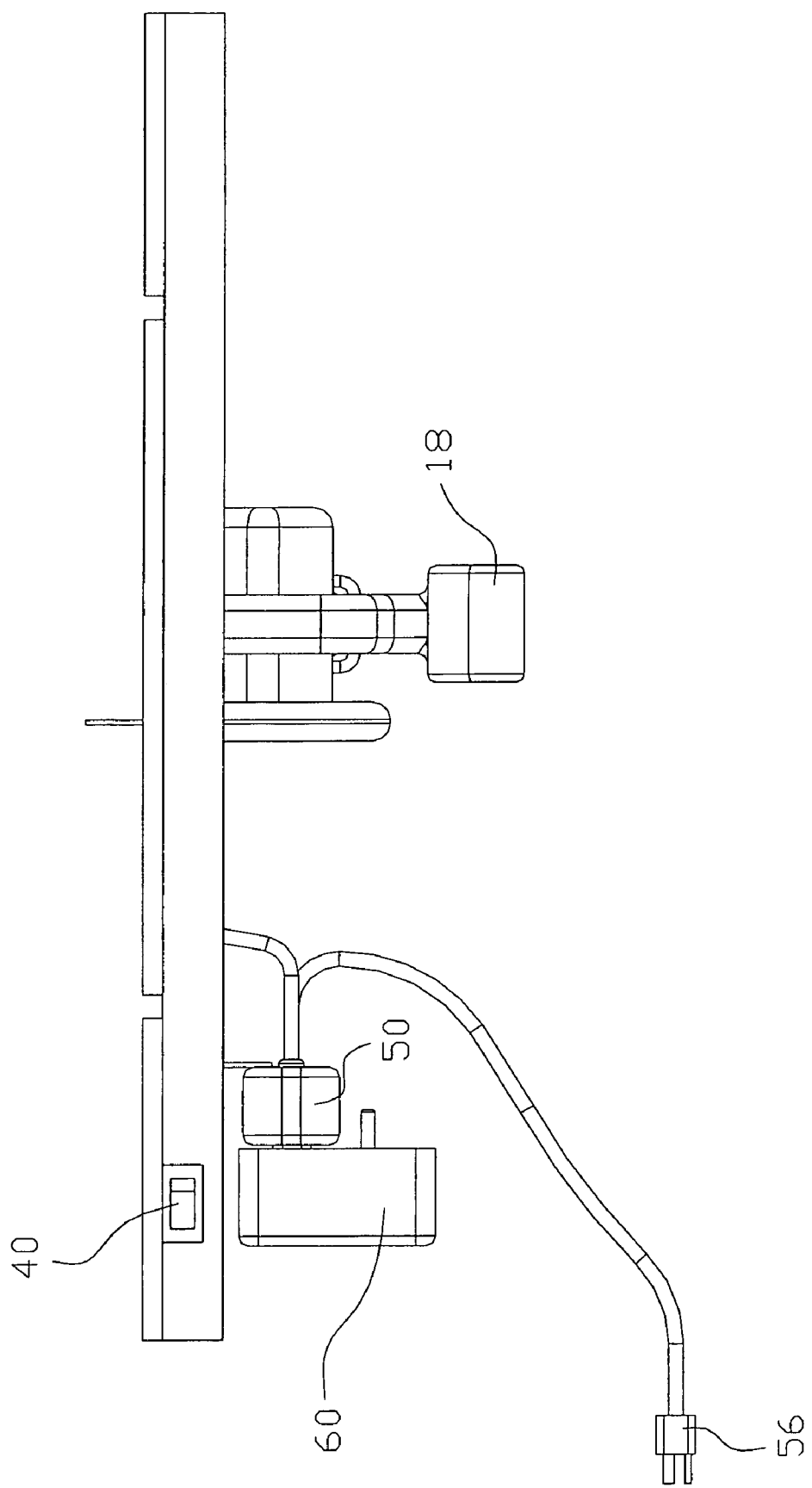
Figure 6C:
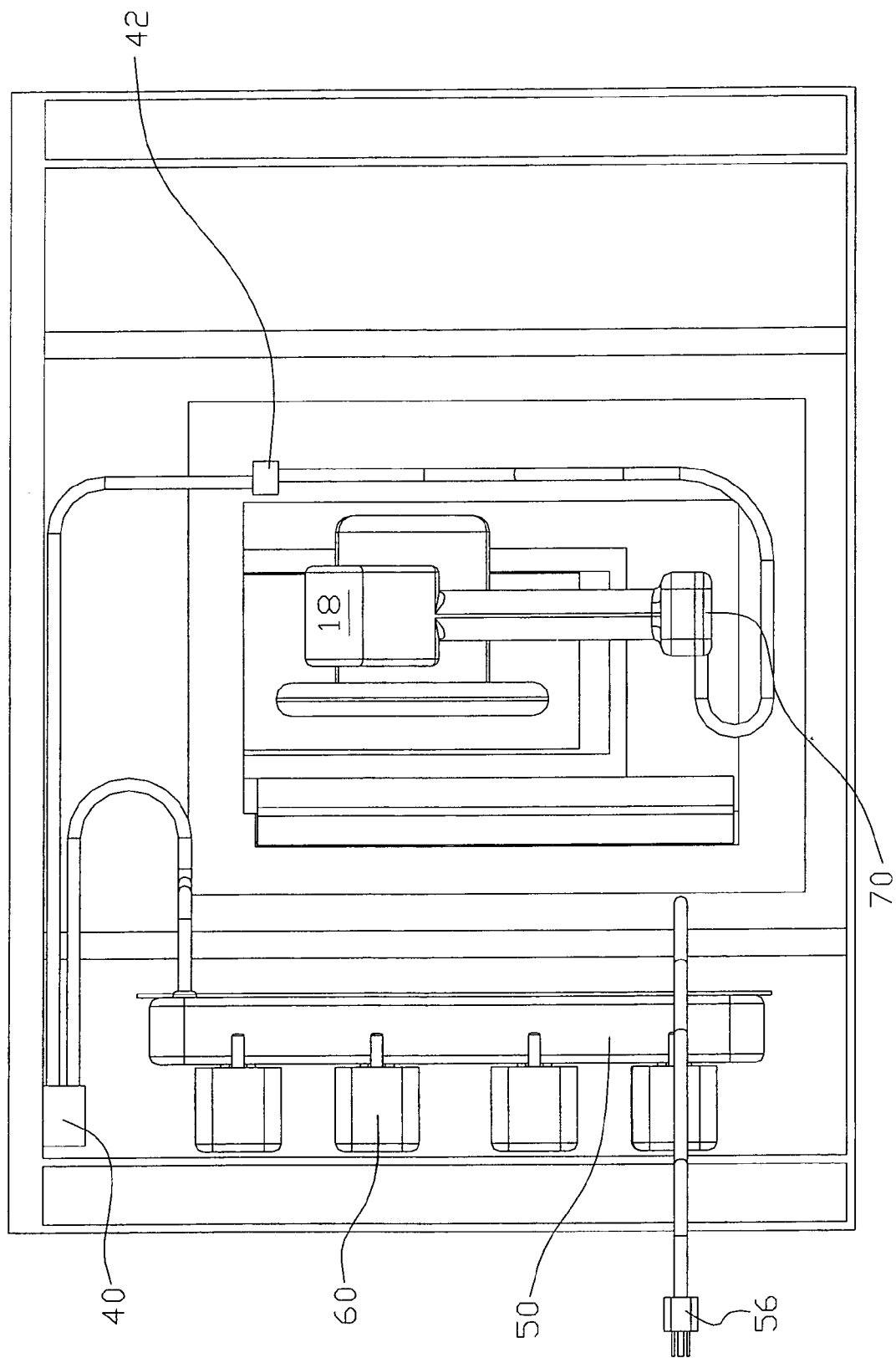
FIG. 6C is a bottom view at a stage during the assembly of the system of FIG. 1.

Turning now to FIGS. 6A–6C, swing arm 30, with cordless power tool 18/mounting plate 80 combination removably coupled thereto, may be pivoted into position so that safety switch 42 is closed and the top faces of platform 20, swing arm 30, and mounting plate 80 are flush. If available and if desired to use, battery station 50 may then be removably coupled to an external AC power source. Otherwise, cordless power tool 18 may then be operated using on/off switch 40, cordless power tool 18 being supplied DC power from batteries 60 or AC/DC converter 54 depending on whether or not battery station 50 is removably coupled to an external AC power source.

While the assembly of cordless power tool and multi-purpose workstation systems 10 and 12 have been described in particular sequences of steps with reference to the drawing figures, it will be understood by those of ordinary skill in the art that the assembly of the invention is not limited to the specific order of steps as disclosed. Any steps or sequence of steps of the assembly of any cordless power tool and multi-purpose workstation system embodiment of the invention indicated herein are given as examples of possible steps or sequence of steps and not as limitations, since various assembly processes and sequences of steps may be used to assemble a cordless power tool and multi-purpose workstation system of the invention.

For example, battery 60 removed from cordless power tool 18, along with any other extra batteries 60, if any, may be removably inserted into battery charging module 52 of battery charging station 50 for recharging and/or powering system 10 after swing arm 30 is pivoted into position. Furthermore, as long as on/of switch 40 is open, battery station 50 may be removably coupled to an external AC power source at any time prior to swing arm 30 being pivoted into position, such as prior to cordless power tool 18 being removably coupled to mounting plate 80.

In describing the use of the present invention further, the following examples illustrate some particular embodiments of cordless power tool and multi-purpose workstation systems of the present invention for home use. For example, such a home use might be where a handyman is using a cordless circular saw to cross cut long pieces of wood to predetermined lengths, and then desires to mount the cordless circular saw to a workstation configured according to an embodiment of the invention to perform rip or miter cuts utilizing a rip fence, a miter gauge, and a work support platform. Notwithstanding, those of ordinary skill in the art will be able to apply these examples to other uses, such as construction use, light industrial use, and the like, as well as other cordless power tools, from the disclosure provided herein. Moreover, although specific components are disclosed in the following examples, it will be understood by those of ordinary skill in the art that other components may be utilized.

EXAMPLE 1

Although the invention may be readily adapted to a variety of embodiments of a cordless power tool and multi-purpose workstation system, with reference to FIG. 7, cordless power tool and multi-purpose workstation system 14 is another example of a cordless power tool and multi-purpose workstation system of the invention. Cordless power tool and multi-purpose workstation system 14 comprises cordless-power tool and multi-purpose workstation system 10 as previously described in combination with portable case 110.

Portable case 110 may be any case, box, chest, cabinet, or other carrier similar to any tool carrier known in the art. Accordingly, various mounting plates 80, cordless power tools 18, and other tools and items when not being used may be stored in case 110, and when a given one of cordless power tools 80 is desired to be used it may be mounted on swing arm 30 which it alternately shares with the other cordless power tools 80.

Portable case 110 may have a handle 112 mounted thereon at any predetermined location. The rear edge of platform 20 may be pivotally coupled to case 110 in any manner, such as by a hinge (e.g., a piano hinge) in a manner similar to the pivotal coupling of swing arm 30 to platform 20 by hinge 34 for example. Accordingly, once pivotally coupled, platform 20 effectively becomes a hinged lid similar to other known tool carrier lids that may be opened or closed to allow or prevent access to the internal space of case 110. Notwithstanding, it may be advantageous to not couple the rear edge of platform 20 to case 110 as will be described in EXAMPLE 3 below.

Platform 20 may be further secured to case 110 by at least one removable fastener 114. At least one fastener 114 may be any one of any fasteners known in the art used to removably fasten the lids for known tool carriers for example, such as hasps, clasps, catches, and the like. For the exemplary purposes of this disclosure, at least one fastener 114 may be two pairs of hasps, each pair located on opposite corresponding ends of platform 20 and case 110.

EXAMPLE 2

Figure 8:
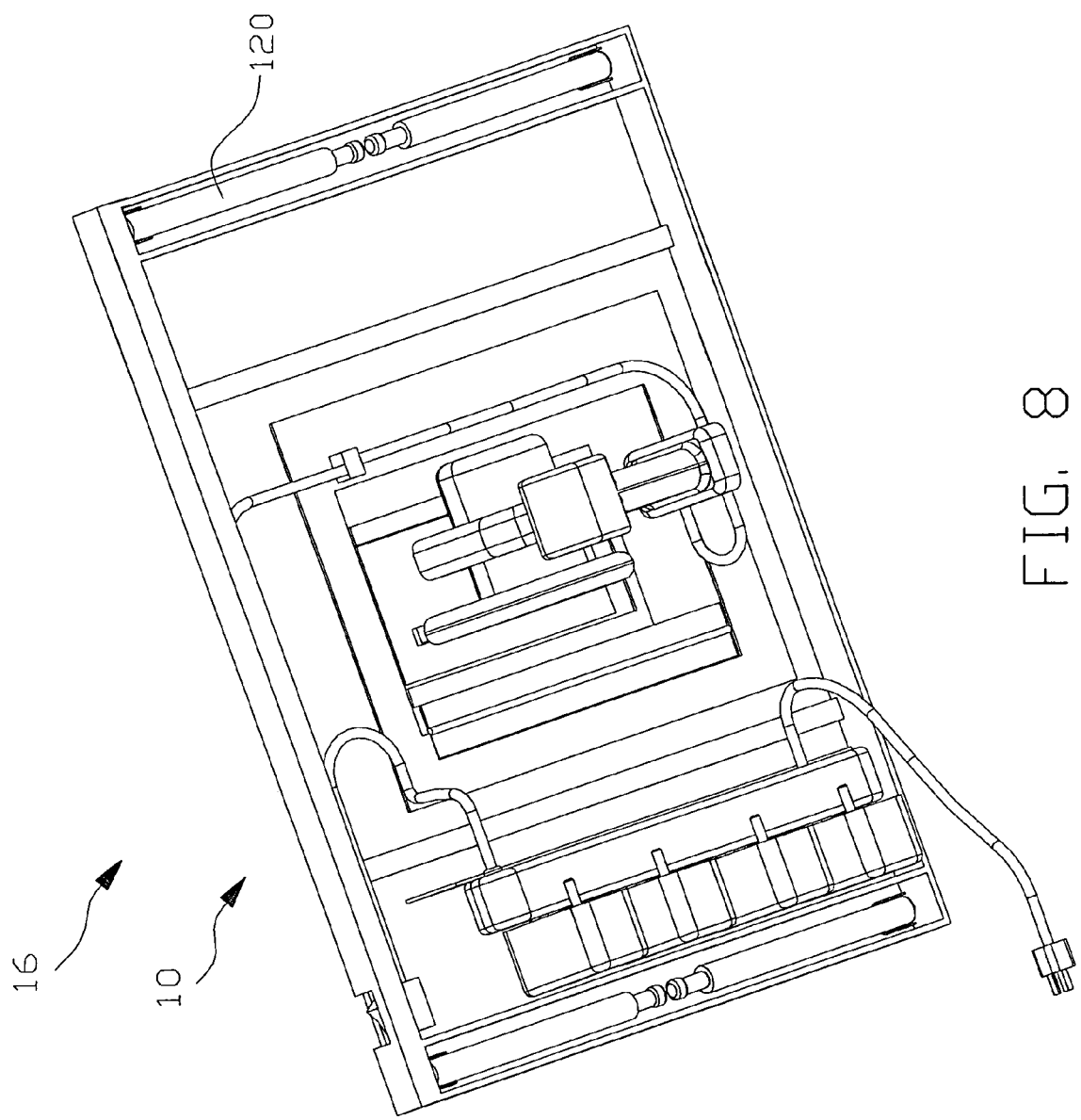
FIG. 8 is a bottom perspective view of a cordless power tool and multi-purpose workstation system according to yet another embodiment of the invention.
Figure 9:
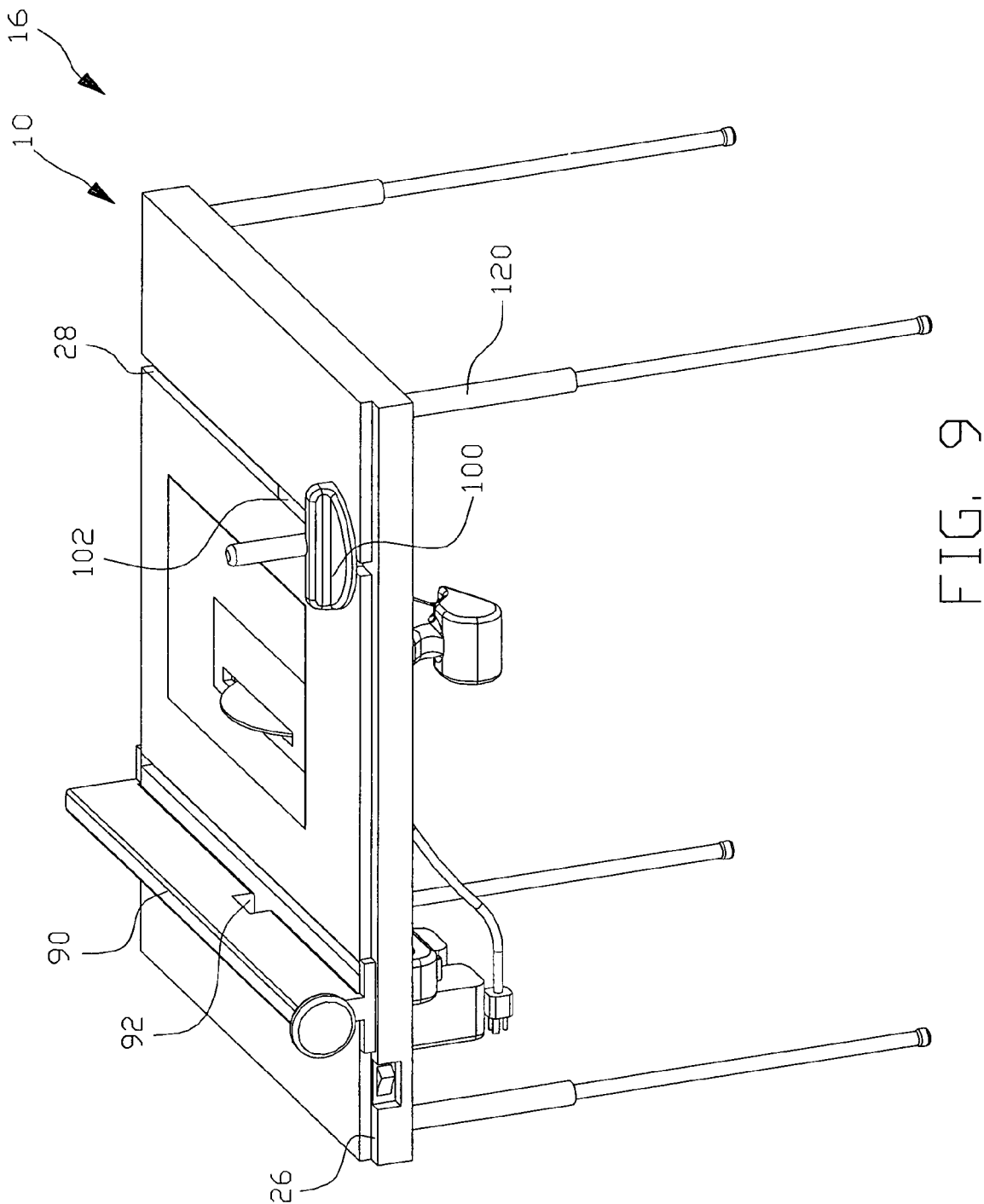
FIG. 9 is a perspective view of the system of FIG. 8.

Although the invention may be readily adapted to a variety of embodiments of a cordless power tool and multi-purpose workstation system, with reference to FIGS. 8–9, cordless power tool and multi-purpose workstation system 16 is still another example of a cordless power tool and multi-purpose workstation system of the invention. Cordless power tool and multi-purpose workstation system 16 comprises cordless power tool and multi-purpose workstation system 10 as previously described in combination with legs 120.

Legs 120 may be any foldable and/or extendable leg known in the art consistent with the intended operation of a cordless power tool and multi-purpose workstation system of the invention. For the exemplary purposes of this disclosure, each leg 120 comprises a foldable and extendable leg. Accordingly, cordless power tool and multi-purpose workstation system 16 may be easily set up at virtually any location at virtually any height of cordless power tool 18 operation ease.

Cordless power tool and multi-purpose workstation system 16 may also comprise fence 90 having fence clearing aperture 92 for accommodating cordless routers. Fence 90 may be any fence known in the art for mounting on workstations. Fence 90 slidably mounts across platform 20 in and perpendicular to fence recess 26. Cordless power tool and multi-purpose workstation system 16 may also comprise miter gauge 100 and slide bar 102. Miter gauge 100 may be any miter gauge known in the art for mounting on workstations. Slide bar 102 of miter gauge 100 is slidably mounted in cross-cut miter slot 28 of platform 20.

EXAMPLE 3

Although the invention may be readily adapted to a variety of embodiments of a cordless power tool and multi-purpose workstation system, with reference to FIGS. 7–9, yet another example of a cordless power tool and multi-purpose workstation system of the invention may be the combination of cordless power tool and multi-purpose workstation systems 14 and 16. That is, cordless power tool and multi-purpose workstation system 16 may be combined with portable case 110 and at least one fastener 114 of cordless power tool and multi-purpose workstation system 14. Accordingly, the resulting cordless power tool and multi-purpose workstation system would provide all the advantages previously described in EXAMPLES 1 and 2.

EXAMPLE 4

Although the invention may be readily adapted to a variety of embodiments of a cordless power tool and multi-purpose workstation system, with reference to FIG. 7 or FIGS. 7–9 respectively, even other examples of a cordless power tool and multi-purpose workstation system of the invention may be either cordless power tool and multi-purpose workstation system 14 or the cordless power tool and multi-purpose workstation system previously described in EXAMPLE 3 respectively in combination with a telescoping handle in place of handle 112 and wheels (e.g., in-line, ball-bearing wheels, casters, swivel casters, and the like), thereby rendering the resulting cordless power tool and multi-purpose workstation systems portable wheeled carts with telescoping handles.

From the foregoing description and for the exemplary purposes of this disclosure, use of cordless power tool and multi-purpose workstation systems configured according to embodiments of the invention provides many advantages over conventional workbenches and AC powered, stand-alone, stationary power tools. For example, embodiments of the invention increase the efficiency and broaden the applications of cordless power tools and allow for handymen and professionals with limited space and/or purchasing power to possess a highly versatile, portable workstation that may be located virtually anywhere regardless of the availability of an external AC electrical power source. Embodiments of the invention may also provide a safety system such that when mounting plates attach the various cordless power tools to the platform's swing arm, the swing arm must be pivoted flush with the platform to depress and close a safety switch to allow the particular cordless tool to operate.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of the method of the present invention indicated herein are given as examples of possible steps or sequence of steps and not as limitations.

The invention claimed is:

1. A workstation for mounting and operating a plurality of cordless power tools comprising:
    a substantially planar work support platform configured to support a work piece and a cordless power tool;
    a substantially planar swing arm pivotally coupled to the work support platform;
    a battery charging station coupled to the work support platform and configured to removably connect to an external AC power source, the battery charging station supplying DC power for cordless power tool operation;
    an on/off switch coupled to the battery charging station for regulating the flow of DC power to a cordless power tool;
    a safety switch coupled to the on/off switch for regulating the flow of DC power to a cordless power tool, both the on/off switch and the safety switch allowing a cordless power tool on/off switch to be safely disengaged when a cordless power tool is mounted to the workstation;
    a power block coupled to the safety switch for removably connecting to the cordless power tool; and
    at least one mounting plate removably coupled to the swing arm, the mounting plate configured to removably couple to a cordless power tool.

2. The workstation of claim 1, wherein the work support platform defines a platform opening through the work support platform, the platform opening configured to removably receive the swing arm in a flush relationship.

3. The workstation of claim 2, wherein the work support platform further comprises at least one flange running at least partially along at least one internal edge of the work support platform defining the platform opening upon which the swing arm removably seats.

4. The workstation of claim 3, wherein the platform opening is substantially rectangular in shape, and wherein the at least one flange comprises one of:
    a right angle flange running around an internal short edge and an adjacent internal long edge of the work support platform; and
    a single flange running along only a long internal edge of the work support platform.

5. The workstation of claim 1, wherein the swing arm is a U-shaped platform comprising a base member and a pair of spaced apart parallel arms defining a swing arm opening, each arm extending perpendicularly from an end of the base member.

6. The workstation of claim 5, wherein the swing arm comprises at least one securing track coupled on a bottom face of the swing arm adjacent to at least a portion of internal edges of the base member and the parallel arms.

7. The workstation of claim 6, wherein the at least one securing track comprises at least one wall protruding perpendicularly outward from the bottom face of the swing arm and an inwardly protruding flange member formed on the exposed end of the at least one wall, thereby defining at least one channel between the flange member, the wall, and the swing arm.

8. The workstation of claim 6, wherein the at least one securing track comprises one of:
    a continuous securing track extending along and adjacent to the internal edges of the base member and the parallel arms of the swing arm defining swing arm opening; and
    three separate and distinct securing tracks, each distinct securing track extending at least partially along and adjacent to the internal edges of the base member and the parallel arms defining swing arm opening respectively.

9. The workstation of claim 1, wherein the swing arm is pivotable to any angle with respect to the work support platform from 0° to approximately 90° for ease in cordless power tool mounting and dismounting.

10. The workstation of claim 1, wherein the swing arm comprises at least one securing track coupled on a bottom face of the swing arm.

11. The workstation of claim 10, wherein the at least one securing track comprises at least one wall protruding perpendicularly outward from the bottom face of the swing arm and an inwardly protruding flange member formed on the exposed end of the at least one wall, thereby defining at least one channel between the flange member, the wall, and the swing arm.

12. The workstation of claim 10, wherein the at least one securing track comprises one of:
   a continuous securing track extending along and adjacent to the internal edges of the base member and the parallel arms of the swing arm defining swing arm opening; and
   three separate and distinct securing tracks, each distinct securing track extending at least partially along and adjacent to the internal edges of the base member and the parallel arms defining swing arm opening respectively.

13. The workstation of claim 1, wherein the battery charging station comprises an AC/DC converter and a battery charging module coupled to an output side of the AC/DC converter, wherein the on/off switch is coupled to the battery charging module, and wherein the workstation further comprises an AC plug coupled to an input side of the AC/DC converter for removably coupling the AC/DC converter to an external AC power source for supplying DC power to the battery charging module for recharging or for supplying DC power to a cordless power tool.

14. The workstation of claim 13, wherein the battery charging module comprises a power relay for directing DC power:
   to charge at least one battery when removably coupled to the battery charging module and when the AC plug is removably coupled to the external AC power source;
   to operate a cordless power tool when a DC circuit to the power block is complete and the power block is removably connected to the cordless power tool and when the AC plug is removably coupled to the external AC power source; and
   from the at least one battery to a cordless power tool when the at least one battery is removably coupled to the battery charging module and when the AC plug is removably coupled to the external AC power source.

15. The workstation of claim 3, wherein the on/off switch is a rocker switch located on a front external edge of the work support platform and the safety switch is a pushbutton switch located on the at least one flange so that it is depressed when the swing arm is pivoted flush with the work support platform and released when the swing arm is pivoted away from the work support platform.

16. The workstation of claim 1, wherein the power block comprises a corded, modular, insulated terminal block, with a cord end connected to the safety switch and a free, terminal block end configured to connect with a cordless power tool.

17. The workstation of claim 1, further comprising at least one battery removably coupled to the battery charging station for supplying DC power to a cordless power tool.

18. The workstation of claim 1, wherein the at least one mounting plate is one of a single, universal mounting plate configured to accommodate a plurality of cordless power tools and a plurality of interchangeable mounting plates, each one configured to accommodate a particular cordless power tool.

19. The workstation of claim 7, wherein the at least one mounting plate is removably mounted in the at least one channel in a tongue and groove relationship.

20. The workstation of claim 19, wherein the at least one mounting plate comprises a top tier narrower than a bottom tier, wherein the top tier is inserted and received in the swing arm opening in a flush relationship while the bottom tier is simultaneously inserted and received in the tongue and groove relationship in the at least one channel.

21. A cordless power tool and workstation system for operating a cordless power tool comprising:
   the cordless power tool, the cordless power tool mounted to a workstation, the workstation comprising:
      a substantially planar work support platform configured to support a work piece;
      a substantially planar swing arm pivotally coupled to the work support platform, wherein the swing arm is pivotable to any angle with respect to the work support platform from 0° to approximately 90° for ease in mounting and dismounting the cordless power tool;
      a battery charging station coupled to the work support platform and configured to removably connect to an external AC power source, the battery charging station supplying DC power to the cordless power tool;
      an on/off switch coupled to the battery charging station regulating the flow of DC power to the cordless power tool;
      a safety switch coupled to the on/off switch regulating the flow of DC power to the cordless power tool;
      a power block coupled to the safety switch and removably connected to the cordless power tool; and
      a mounting plate to which the cordless power tool is removably coupled, the mounting plate removably coupled to the swing arm.

22. The system of claim 21, wherein the work support platform defines a substantially rectangular platform opening through the work support platform, the platform opening configured to removably receive the swing arm in a flush relationship, and wherein the work support platform further comprises one of at least one flange running at least partially along at least one internal edge of the work support platform defining the platform opening upon which the swing arm removably seats.

23. The system of claim 21, wherein the swing arm is a U-shaped platform comprising a base member and a pair of spaced apart parallel arms defining a swing arm opening, each arm extending perpendicularly from an end of the base member.

24. The system of claim 23, wherein the swing arm comprises at least one securing track coupled on a bottom face of the swing arm adjacent to at least a portion of internal edges of the base member and the parallel arms.

25. The system of claim 24, wherein the at least one securing track comprises at least one wall protruding perpendicularly outward from the bottom face of the swing arm and an inwardly protruding flange member formed on the exposed end of the at least one wall, thereby defining at least one channel between the flange member, the wall, and the swing arm.

26. The system of claim 21, wherein the battery charging station comprises an AC/DC converter and a battery charging module coupled to an output side of the AC/DC converter, wherein the on/off switch is coupled to the battery charging module, and wherein the workstation further comprises an AC plug coupled to an input side of the AC/DC converter for removably coupling the AC/DC converter to an external AC power source for supplying DC power to the battery charging module for recharging or for supplying DC power to the cordless power tool.

27. The system of claim 26, wherein the battery charging module comprises a power relay for directing DC power:
to charge at least one battery when removably coupled to the battery charging module and when the AC plug is removably coupled to the external AC power source;
to operate the cordless power tool when the AC plug is removably coupled to the external AC power source; and
from at least one battery to the cordless power tool when the at least one battery is removably coupled to the battery charging module and when the AC plug is removably coupled to the external AC power source.

28. The system of claim 22, wherein the on/off switch is a rocker switch located on a front external edge of the work support platform and the safety switch is a pushbutton switch located on the at least one flange so that it is depressed when the swing arm is pivoted flush with the work support platform and released when the swing arm is pivoted away from the work support platform.

29. The system of claim 21, wherein the power block comprises a corded, modular, insulated terminal block, with a cord end connected to the safety switch and a free, terminal block end connected with the cordless power tool.

30. The system of claim 21, further comprising at least one battery removably coupled to the battery charging station for supplying DC power to the cordless power tool.

31. The system of claim 21, wherein the mounting plate is one of a plurality of interchangeable mounting plates, each one configured to accommodate a particular cordless power tool.

32. The system of claim 25, wherein the at least one mounting plate comprises a top tier narrower than a bottom tier, wherein the top tier is inserted and received in the swing arm opening in a flush relationship while the bottom tier is simultaneously inserted and received in the tongue and groove relationship in the at least one channel.

33. A method of installing a cordless power tool on a workstation for operation, the workstation comprising a work support platform, a swing arm pivotally coupled to the work support platform, a battery charging station coupled to the work support platform, an on/off switch coupled to the battery charging station, a safety switch coupled to the on/off switch, a power block coupled to the safety switch, and a mounting plate, the method comprising:
removing a battery from the cordless power tool;
removably coupling the cordless power tool to the mounting plate;
removably coupling the mounting plate to the swing arm;
removably coupling the power block to the cordless power tool in place of the battery of the cordless power tool;
pivoting the swing arm flush with the work support platform, thereby closing the safety switch; and
operating the cordless power tool using the on/off switch.

34. The method of claim 33, further comprising:
removably inserting the battery of the cordless power tool into the battery charging station for supplying DC power to the cordless power tool.

35. The method of claim 34, further comprising:
removably inserting a plurality of extra batteries into the battery charging station for supplying DC power to the cordless power tool.

36. The method of claim 34, wherein the battery charging station comprises an AC/DC converter and a battery charging module coupled to an output side of the AC/DC converter, wherein the on/off switch is coupled to the battery charging module, and wherein the step of removably inserting the battery of the cordless power tool comprises removably inserting the battery of the cordless power tool into the battery charging module for supplying DC power to the cordless power tool.

37. The method of claim 33, further comprising:
removably coupling the battery charging station to an external AC power source for recharging and for supplying DC power to the cordless power tool.

38. The method of claim 37, further comprising:
removably inserting the battery of the cordless power tool into the battery charging station for one of recharging and supplying DC power to the cordless power tool when the battery charging station is not coupled to the external AC power source.

39. The method of claim 38, further comprising:
removably inserting a plurality of extra batteries into the battery charging station for one of recharging and supplying DC power to the cordless power tool when the battery charging station is not coupled to the external AC power source.

40. The method of claim 37, wherein the battery charging station comprises an AC/DC converter and a battery charging module coupled to an output side of the AC/DC converter, wherein the on/off switch is coupled to the battery charging module, wherein an AC plug is coupled to an input side of the AC/DC converter, wherein the step of removably coupling the battery station to an external AC power source comprises removably coupling the AC/DC converter to an external AC power source via the AC plug for supplying DC power to the battery charging module for recharging or for supplying DC power to a cordless power tool, and wherein the step of removably inserting the battery of the cordless power tool comprises removably inserting the battery of the cordless power tool into the battery charging module for one of recharging and supplying DC power to the cordless power tool.

* * * * *